Dec. 14, 1965 L. J. McDONALD 3,223,937
MULTI-CHANNEL EXPRESSION CONTROL FOR
ELECTRICAL MUSICAL INSTRUMENTS
Filed June 5, 1962 2 Sheets-Sheet 1

INVENTOR.
Lyell J. McDonald
BY
Mueller & Nichols
Attys.

Dec. 14, 1965 L. J. McDONALD 3,223,937

MULTI-CHANNEL EXPRESSION CONTROL FOR ELECTRICAL MUSICAL INSTRUMENTS

Filed June 5, 1962 2 Sheets-Sheet 2

INVENTOR.
Lyell J. McDonald
BY Mueller & Aichele
Attys.

United States Patent Office 3,223,937

Patented Dec. 14, 1965

3,223,937

MULTI-CHANNEL EXPRESSION CONTROL FOR ELECTRICAL MUSICAL INSTRUMENTS

Lyell J. McDonald, Elkhart, Ind., assignor to C. G. Conn, Ltd., Elkhart, Ind., a corporation of Indiana Filed June 5, 1962, Ser. No. 200,265
6 Claims. (Cl. 330—28)

This invention relates to electronic expression control circuits and particuarly to circuits for remotely controlling the level or signal characteristics in a plurality of signal translating channels from a single remote point.

In many applications it is desirable to control the level or other characteristics of a signal such as an audio frequency signal in an amplifier chain translating such signals by controlling the gain characteristics of one or more amplifiers in the chain. Typically in prior art systems gain control is accomplished by controlling the direct current biasing arrangement and hence the static operating parameters of the amplifying device. Such systems have inherent disadvantages in that it is often desirable to optimize the static operating conditions for a particular application. This is particularly important in circuits used in electronic musical instruments where generation and amplification of signals having a precise predetermined waveform is required and where any change in the static operating conditions of the amplifying devices may result in a change in these waveforms.

In still other known systems gain or expression control is accomplished by a potentiometer arrangement in the interstage coupling network between amplifying devices in the chain. Since potentiometers generate noise transients during adjustment, such an arrangement is ill suited for applications such as electronic organs, where a continuous manual change in signal characteristics is often desirable. Also, for a multi-channel application it is necessary to either utilize a single potentiometer common to all channels or to use a plurality of potentiometers, appropriately ganged, to individually control each channel. The former arrangement is undesirable since it results in signal mixing, while the latter arrangement requires complex mechanical or electro-mechanical coupling to insure proper tracking of the ganged potentiometers.

It is therefore an object of this invention to provide signal level or expression control in an amplifier system which will change the signal in response to external stimuli without changing the static operating parameters of the amplifier system.

Another object is to provide a control circuit capable of continuously changing the output signal level in a signal translating system from a remote point without introducing unwanted noise or distortion into the signal as its characteristics are being changed.

A further object of the invention is to provide an expression control circuit for controlling signal characteristics in a plurality of signal translating channels from a single remote point without signal mixing.

Still another object is to provide means for controlling the gain of each of a plurality of amplifier channels in response to an external stimuli from a single source without changing preset static operating characteristics of any of the amplifying channels.

A feature of the present invention is the provision of a condition responsive means for controlling the dynamic impedance in a feedback path of a signal translating stage to control the signal translating characteristics of the stage in response to the application of control stimuli to the condition responsive means.

Another feature is the provision of a biased diode circuit arrangement in the alternating current feedback path to an amplifying device and means to control the static operating point and hence the dynamic impedance presented by the diode to feedback signals to thereby control signal translating characteristics of the amplifying device without changing its static operating parameters.

A further feature of the invention is the provision of a biased diode circuit arrangement in the feedback path to an amplifying device for varying the dynamic impedance of the path to control feedback signals to the amplifying device. The biased diode circuit arrangement includes a pair of diodes connected in push-pull relationship with respect to alternating current signals to cancel even harmonics generated by non-linear characteristics of such diodes, and includes a coupling capacitor to isolate the biasing signal for the diodes from the static operating voltages of the amplifier and to provide frequency response compensation for the amplifier.

A still further feature is the provision of a multi-channel amplifying system, with each amplifying channel having a feedback path including a condition responsive means presenting a controllable dynamic impedance to the feedback signal. A single control means is used for simultaneously controlling the dynamic impedance presented to the feedback signals so that the signal translating characteristics of each channel may be changed without the introduction of noise or mixing of the signals.

Figure 2:
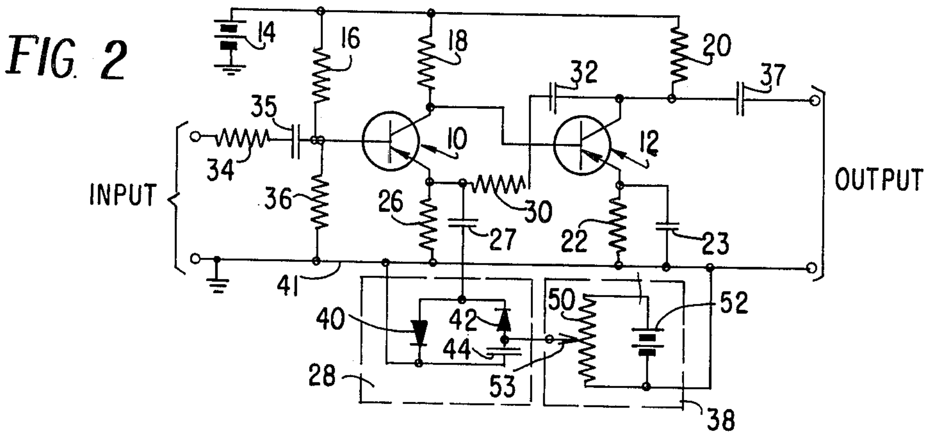
FIG. 2 is a schematic diagram of a specific circuit embodiment of the present invention.
Figure 4:
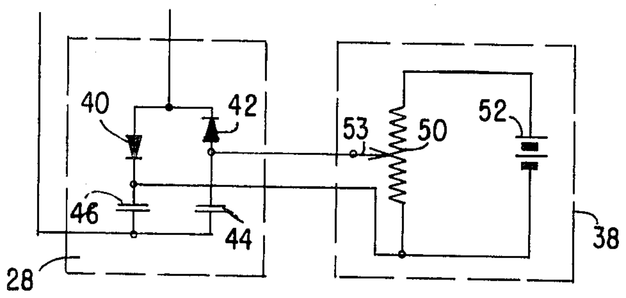
Figure 3A:
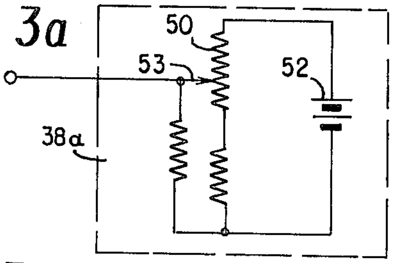
Figure 3B:
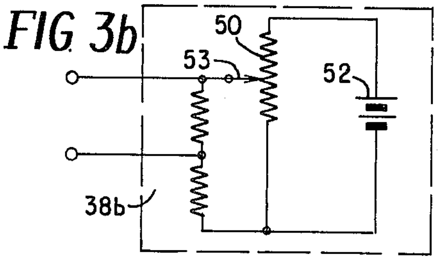
Figure 3C:
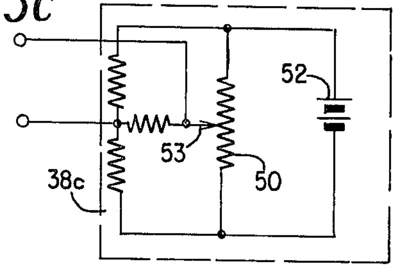
Figure 3D:
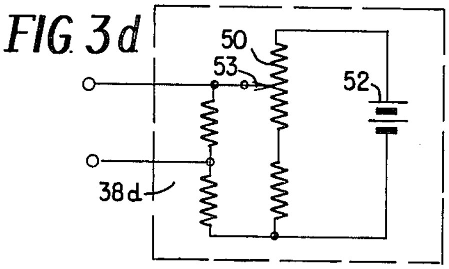
Figures 5, 6:
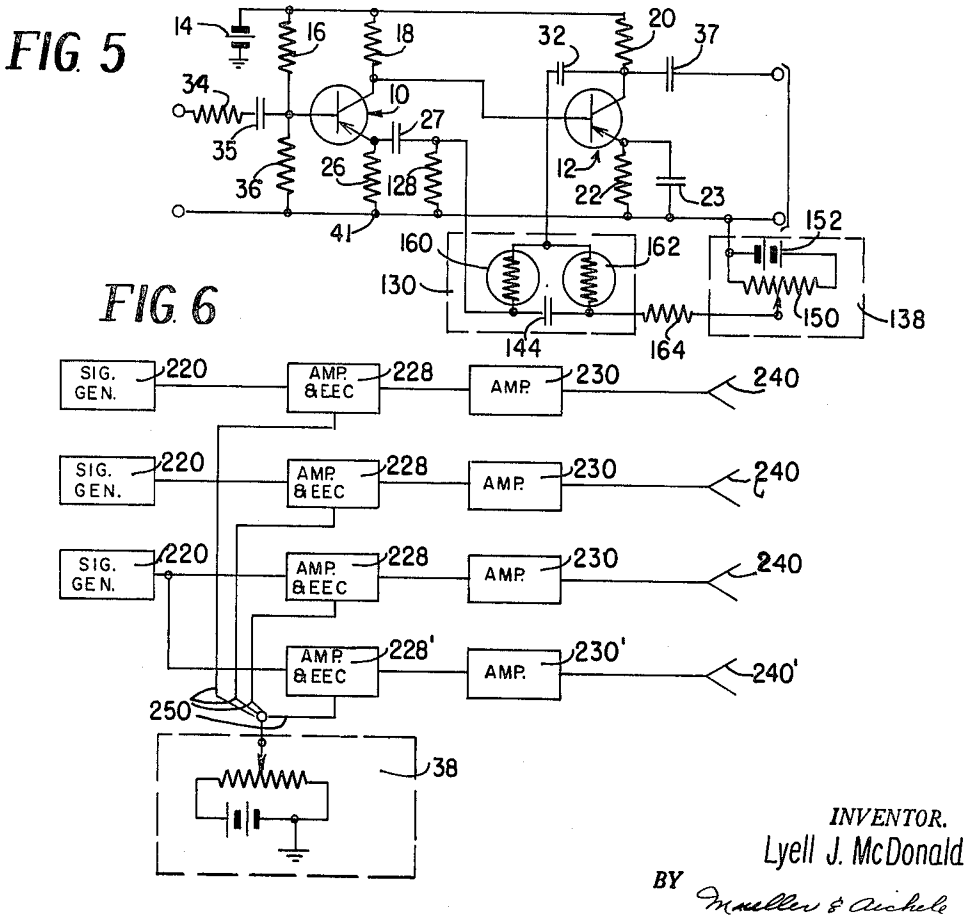

FIGS. 3*a*–3*d* illustrate useful control circuits which may be used with various circuit embodiments of the present invention;

FIG. 4 shows a modification of portions of the circuit of FIG. 2;

FIG. 5 is a schematic diagram of another embodiment of the present invention; and FIG. 6 is a diagram, in block form, of an overall system for use with the present invention.

In the present invention a degenerative feedback path is provided for an amplifying device such as a transistor or a vacuum tube. The static operating parameters of the device are optimized for a particular application. Condition responsive means for presenting a dynamic impedance, controllable by an external stimuli, is provided in the feedback path to control the A.C. feedback signal to the amplifying device. When this condition responsive means is in a quiescent condition the gain of the amplifying device remains at a predetermined level. An external stimuli or control signal source, such as a D.C. control voltage, a light source or a heat source changes the dynamic impedance presented to the A.C. feedback signal by the condition responsive means and results in a corresponding change in the gain of the amplifying device. The stimuli or control signal causing the change in dynamic impedance is isolated from the amplifying device so that only the feedback signal and not the static operating parameters of the amplifying device is changed. It is therefore possible to maintain optimized static operating conditions for the amplifying device at all signal levels and further possible to arrange several amplifying channels, each having a condition responsive device in its feedback path, to be controlled from a single remote point without the signal mixing or without any noise which may be produced by the external control being injected into the signal translating channels.

Figure 1:
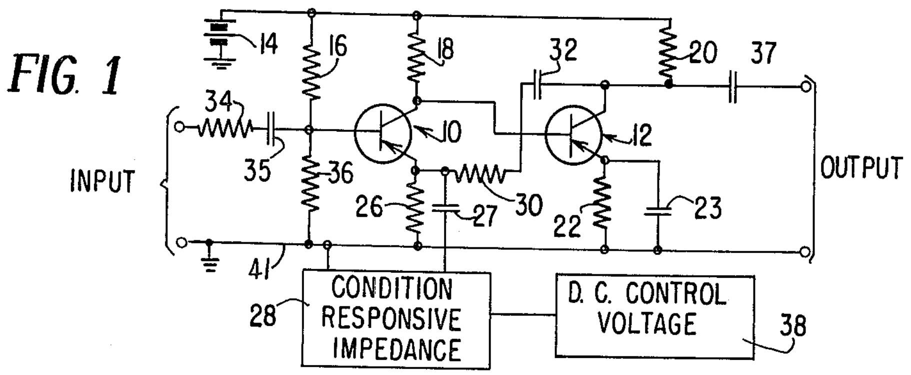
FIG. 1 is a circuit diagram, partly in schematic and partly in block form, of the expression control circuit of the present invention.

As shown in FIG. 1, transistors 10 and 12 are connected as a two stage amplifier in the conventional manner. Static operating voltages are supplied from a suitable source 14 through resistors 16, 18 and 20. The emitter electrode of transistor 12 is connected by resistor 22, suitably bypassed by capacitor 23, to common lead 41, maintained at reference potential. The emitter electrode of transistor 10 is connected by resistor 26 to lead 41. The base electrode of transistor 10 is connected to lead 41 by resistor 36. Base-to-emitter bias for transistor 10 is established by voltage source 14 and resistors 16, 36, and 26, and its collector voltage by collector current flow through resistor 18. Base-to-emitter bias for transistor 12 is established by the collector voltage of transistor 10 and resistor 22, which resistor is selected for optimum collector current for transistor 12 to minimize distortion and to provide desired open-loop gain for the stages.

A circuit including capacitor 27 and condition responsive impedance 28 is connected in parallel with resistor 26 to establish the A.C. operating point of transistor 10. Degenerative or negative feedback is provided to transistor 10 through a path including direct current isolating capacitor 32 and feedback resistor 30 series connected between the collector electrode of transistor 12 and the emitter electrode of transistor 10. Input signals are coupled between the base electrode of transistor 10 and a reference point by the network including resistor 34, capacitor 35 and resistor 36. Output signals between the collector electrode of transistor 12 and a reference point are coupled through capacitor 37.

Degenerative feedback between transistor 12 and transistor 10, and hence the gain of the amplifier stages, is controlled by the impedance value of resistor 30 in series with the parallel network including resistor 26, capacitor 27 and condition responsive impedance 28. A change in value of any one of these network elements effectively controls the gain of transistor 10. When resistor 30 is of a fixed value, gain control of the amplifier stage can be achieved by changing the impedance of the combination of resistor 26 in parallel with capacitor 27 and condition responsive impedance 28. It is desirable that resistor 26 be maintained constant so that the static operating conditions of transistor 10 may be optimized and that it be of a relatively large value to provide a high degree of degeneration for large dynamic impedances presented by condition responsive impedance 28. If capacitor 27 is large so that its impedance is relatively small responsive impedance 28, and if condition responsive at all frequencies of interest with respect to condition impedance 28 is substantially resistive in nature, effective gain control is achieved by changing the value of condition responsive impedance 28.

For the conditions indicated above, and assuming the reactance of capacitor 32 to be negligible, the frequency response will be substantially constant over a frequency range of interest for varying levels of gain of the system. Where compensation in frequency response is desired, capacitor 27 may be selected to present a significant impedance at certain frequencies of interest. Thus, where the reactance of capacitor 27 is consequential, the gain is different at different frequencies to provide frequency compensation opposing changes in gain with frequency due to coupling capacitor 32. It is further possible to provide changes in frequency response with gain in a desired manner by proper selection of values for capacitors 27 and 32 and resistor 30, or by providing frequency compensating networks conventional in the art. For example, resistor 30 may be shunted by a capacitor, capacitor 32 may be shunted by a resistor, or known networks may be used to shunt condition responsive impedance 28.

Condition responsive impedance 28 may be one of a number of devices which will undergo an impedance change when stimulated from an external source. Typically this impedance may include biased diodes, varistors, thermistors or photosensitive devices. The stimuli shown in FIG. 1 is a direct current control voltage supplied by source 38, although it is to be understood that this stimuli may include light or heat sources, depending on the nature of condition responsive impedance device 28.

A particular circuit embodiment including biased diodes in the feedback path is shown in FIG. 2. A direct current bias potential supplied to a semiconductor diode device such as a silicon, germanium, or selenium rectifier will establish the static operating point and the dynamic resistance of such device at that static operating point. Incremental voltage changes around the established operating point, such as a small alternating current signal, are subject to this dynamic resistance. A change in static operating point will result in a change in dynamic resistance presented to small A.C. signals. Thus, changing the D.C. bias potential for the diode in the feedback path results in effective impedance control in the A.C. feedback path.

To this end diode 40 is series connected between capacitor 27 and the alternating current reference point 41, and poled such that its cathode electrode is common with the reference point. Diode 42 is connected between arm 53 of potentiometer 50 and the common point of the anode electrode of diode 40 and capacitor 27, and poled such that its cathode electrode is common with the anode electrode of diode 40. Capacitor 44 couples the anode electrode of diode 42 to the alternating current reference point. A biasing potential from D.C. voltage control supply 38 is supplied to the anode electrode of diode 42 and because of its series relationship with diode 40, to the anode electrode of diode 40. The polarity of voltage source 38 is such that a positive potential is applied to the anode electrodes of diodes 40 and 42 to establish their static operating points and hence the dynamic impedance presented to small A.C. signals about this established point. Diodes 40 and 42 are therefore connected in series with respect to the D.C. biasing potential provided by source 38 and in parallel and push-pull with respect to alternating current signals. The effective dynamic impedance presented to small A.C. signals is one-half the impedance of either diode.

Any non-linearity in the operating characteristics of the diodes will tend to cause some harmonic distortion in the feedback signal as it produces a voltage swing around the operating point established by D.C. control voltage source 38. This distortion manifests itself in harmonics which may be determined by a Fourier analysis of complex waveforms in the well known manner. Since most diodes are non-linear to some degree, and since the A.C. feedback signal causes some change in the dynamic resistance of the diodes, a small amount of distortion may occur. It can be seen that diodes 40 and 42 are connected in push-pull with respect to alternating current signals to provide a push-pull mode of operation with the result that even order harmonics tend to cancel. With proper selection of diodes 40 and 42, complete elimination of even order harmonics can be achieved. Therefore, this dual diode arrangement tends to aleviate the harmonic distortion effects due to non-linearity in the operating characteristics of impedance controlled diodes 40 and 42. It has been found that selenium diodes produce the least harmonic distortion. In applications where small feedback signals are experienced, or where some harmonic distortion can be tolerated, a single diode 40 may be used by replacing diode 42 with a resistance having a value equal to or larger than resistor 26.

In its simplest form direct current control voltage source 38 includes potentiometer 50 connected in parallel with potential supply 52, conveniently shown as a battery. The position of wiper arm 53 supplies a D.C. potential to the anode electrodes of diodes 40 and 42 and establishes their static operating points to control the A.C. impedance in the feedback path between transistors 10 and 12. Since the change in dynamic resistance of diodes 40 and 42 is not usually a linear function of the bias voltage supplied to it, the output signal of the amplifier is not a linear function of the setting of wiper arm 53. If linear control is desired, potentiometer 50 may be non-linear with appropriate compensation to match the particular type diode utilized. FIGS. 3*a* to 3*d* represent other direct current control voltage sources that may be used. Since various amplifiers may require different level ranges and different minimum and maximum levels for optimum operation, the various control circuits shown illustrate the flexibility with which the output level of the amplifier of the present circuit may be controlled. These and other well known voltage control circuits may be utilized either with a linear or non-linear potentiometer to control one or more amplifiers from a single remote point.

To eliminate transients which may flow through the emitter of transistor 10 and capacitor 27 when the bias voltage to diodes 40 and 42 is changed, the condition responsive impedance and D.C. control voltage circuits may take the form illustrated in FIG. 4. Capacitor 46 couples the cathode electrode of diode 40 to the A.C. reference point. The common or negative side of supply 38 is returned to the cathode electrode of diode 40 and is isolated from the A.C. reference point by capacitor 46. If capacitors 44 and 46 are selected to be of the same value, these capacitors, along with diodes 40 and 42, form a balanced bridge to transients introduced by the control voltage so that they cancel. This modification is particularly useful when relatively high control voltages are used.

In general, optimized parameters for transistor circuits require that condition responsive impedance 28 be a relatively low impedance device. Diodes biased in the above described manner present suitable impedances for this purpose. Varistors may also be used in condition responsive impedance circuit 28. However, varistors are usually considered high impedance devices and require a larger biasing voltage range to produce effective change in dynamic resistance. Therefore, use of varistors as the impedance in the circuit of FIG. 2 may necessitate an increase in the value of resistor 26, increasing static operating voltages applied to transistors 10 and 12. On the other hand, substitution of vacuum tubes for transistors 10 and 12 provide a circuit well suited for the use of varistors as a condition responsive impedance since such devices have inherently high impedance, high voltage static conditions.

High impedance condition responsive devices such as varistors, thermistors and photoconductive devices may also be employed in place of feedback resistor 30 to provide level control of the amplifier circuit. In this instance impedance 28 becomes a resistor 128 of fixed value. A circuit embodiment of this type is shown in FIG. 5 wherein like circuit elements refer to like reference numerals as in FIGS. 1 and 2. Condition responsive impedance circuit 130 is connected in series between capacitor 32 and the junction point between capacitor 27 and resistor 128. Resistor 26 provides D.C. emitter bias for transistor 10 while an A.C. emitter return path is provided by capacitor 27 series connected with resistor 128. Proper selection of the value of capacitor 27 in this circuit also provides frequency response compensation for the amplifier circuit. Varistors 160 and 162 are connected in A.C. parallel by capacitor 144 to provide a feedback impedance between the collector of transistor 12 and the A.C. emitter return path of transistor 10. A D.C. control voltage from source 138 is supplied through resistor 164 to varistors 160 and 162 and back to a reference point 41 through resistor 128. Resistor 164 serves to isolate voltage source 138 from impedance circuit 130 so that when the arm of potentiometer 150 is in its minimum position it does not shunt resistor 128 to cause a reduction in the range of signal level control.

The voltage provided by source 138 functions to control the dynamic impedance of varistors 160 and 162 thereby controlling the amount of feedback between transistors 12 and 10. Capacitors 27 and 32 isolate this D.C. path so that the control voltage does not change the static operating conditions of either transistor 10 or 12. Changes in control voltage applied to varistors 160 and 162 therefore result in a change in the dynamic resistance presented to A.C. feedback signals to control the gain of the amplifier. It should be apparent from this circuit arrangement that other condition responsive impedances such as variable conductance photocells or thermistors can be used rather than the varistors shown. In such instances the control stimuli applied to the condition responsive impedances may be light or heat rather than the D.C. voltage shown in the case of varistors. Because of the circuit isolation provided, only the feedback signal of the amplifier is changed, and the static operating conditions remain fixed at an optimum value.

The manner in which a plurality of amplifier channels may be combined for expression control is illustrated in FIG. 6. Each amplifying channel shown therein includes a signal source 220, amplifying means 228 including condition responsive impedance means and an output amplifying device 230 to drive speakers 240. It is to be understood that individual circuits of signal generating and amplifying means 220 and amplifying stages 230 do not form part of the present invention but are merely set forth to illustrate the manner in which the present invention is to be utilized. Signal source 220 may, for example, be tone generators including appropriate mixing busses and a predetermined amount of amplification as is customary in electronic organ systems. Amplifying stages 228 may be of the types illustrated in FIGS. 2 and 5, having sufficient amplification with feedback to provide the desired range of control. An auxiliary circuit including amplifying means 228′ and output amplifier 230′ may also be provided for the purposes of acoustic tremolo, as is conventional in the organ art. Each individual amplifying means 228 may have its bias circuit designed to yield a particular type of frequency compensation by selection of capacitor 27 (FIG. 2) or by other means as previously discussed, and may have predetermined static conditions to yield desired minimum and maximum signal level and loudness ranges.

Control of the condition responsive means in amplifiers 228 is achieved by supplying a D.C. voltage on control busses 250 from control source 38. Control source 38 provides an expression control voltage in the manner discussed in conjunction with FIGS. 3*a* to 3*d*. When the system of FIG. 6 is utilized in an electronic organ, control source 38 may include an electromechanical control mounted on the expression pedal of the organ. It is readily apparent that this type of arrangement provides expression control for a plurality of signal translating channels. There is no signal mixing and ganging and tracking problems are eliminated. Noise transients and distortion caused by movement of the potentiometer in control voltage source 38 are eliminated by the circuit arrangement including the condition responsive means in amplifying means 228. Since only direct current is carried by control signal busses 250 problems of stray pickup and cross-talk are minimized so that wiring of a complex multi-channel chassis is simplified.

The invention provides therefore a simple and effective electronic control circuit for signal translating channels. By providing a variable dynamic impedance in the feedback path to an amplifier stage, signal level control is achieved without changing the static operating parameters of stages in the signal translating channels. Although shown in conjunction with two stage amplifiers, it should be apparent that the dynamic impedance may be changed in the manner disclosed to control the feedback and hence the gain of single stage or multistage amplifier systems. Signal level control of the type set forth allows static operating conditions to be optimized for particular applications, and allows a plurality of channels to be ganged for control from a single source without signal mixing or distortion.

What is claimed is:

1. In an electric organ, the combination including, a plurality of channels for translating audio frequency signals representing selected tones creating a desired musical effect, first and second transistors connected as cascade amplifier stages in each of said channels, each of said transistors having input, output and common electrodes, separate feedback circuit means for coupling the output electrode of said second transistor to the common electrode of said first transistor of each of said channels to provide signal degeneration for said channel, each of said feedback circuit means including capacitor means to cause variations in frequency response with the gain of said amplifier stages of each of said channels and semiconductor diode means coupled to said feedback circuit means to control degeneration of said audio frequency signals in response to a direct current control voltage applied thereto to thereby control the gain of said amplifier stages, a control circuit for developing a direct current control voltage independently of said audio frequency signals, and circuit means applying said direct current control voltage to said semiconductor diode means of all of said channels for concurrently controlling the gain of all of said channels so that tone signals therein are held in balanced relation, with each of said channels having a selected frequency-gain response characteristic.

2. An electric organ including in combination, a plurality of channels for translating audio frequency signals representing selected tones, with the tones of all channels being simultaneously reproduced to provide a desired musical effect, each of said channels having first and second transistors connected as cascade amplifier stages, each of said transistors having base, emitter and collector electrodes, resistance means connecting said emitter electrodes to a reference potential, means applying audio signals to said base electrode of said first transistor of each channel, means coupling said collector electrode of said first transistor to said base electrode of said second transistor of each of said channels, feedback circuit means coupling said collector electrode of said second transistor to said emitter electrode of said first transistor of each of said channels to provide signal degeneration for said channel, each of said feedback circuit means including frequency responsive impedance means to cause variation in frequency response with gain of said amplifier stages of each of said channels and voltage sensitive impedance means coupled to said feedback circuit means to control degeneration of said audio frequency signals in response to a direct current control voltage applied thereto to thereby control the gain of said amplifier stages, a control circuit for developing a direct current control voltage which is independent of said audio frequency signals, and circuit means applying said direct current control voltage to said voltage sensitive impedance means of all of said channels for concurrently controlling the level of signals in all said channels to hold the same in balanced relation, with each of said channels having a selected frequency-gain response characteristic.

3. A channel for amplifying audio frequency signals including in combination, first and second transistors each having emitter, collector and base electrodes, circuit means supplying an operating voltage to the collector electrode of each of said transistors and a biasing voltage to the base electrode of each of said transistors, input circuit means applying audio frequency signals to the base electrode of said first transistor, means connecting the collector electrode of said first transistor to the base electrode of said second transistor to apply said audio frequency signals thereto, resistance means connecting the emitter electrode of each of said transistors to a reference potential, with said resistance means connected to said emitter electrode of said second transistor being bypassed for said audio frequency signals, a feedback network for said audio frequency signals including first and second semiconductor diodes connected in series and each having first and second electrodes, first capacitor means coupling one electrode of said first diode to said reference potential, means coupling the opposite electrode of said second diode to said reference potential, second capacitor means coupling the common junction of said series connected diodes to said emitter electrode of said first transistor, circuit means including third capacitor means coupling the collector electrode of said second transistor to the emitter electrode of said first transistor, said second and third capacitor means providing a frequency response for said audio frequency signals that varies with the gain of said first transistor, and control circuit means providing a direct current voltage independently of said audio frequency signals, said control circuit means applying said direct current voltage to said one electrode of said first diode to control the impedance of said first and second diodes, whereby variation in said direct current voltage varies the gain of said first transistor.

4. In an electric organ, the combination including a plurality of channels for amplifying audio frequency signals representing selected tones creating a desired musical effect, each of said channels having first and second transistors each having emitter, collector and base electrodes, circuit means supplying an operating voltage to the collector electrode of each of said transistors and a biasing voltage to the base electrode of each of said transistors, input circuit means applying selected audio frequency signals to the base electrode of said first transistor of each of said channels, with the collector electrode of said first transistor connected to apply said audio frequency signals to the base electrode of said second transistor in each of said channels, resistance means returning the emitter electrode of each of said transistors to a reference potential, with said emitter return resistance means of said second transistor of each channel bypassed for said audio frequency signals, each of said channels further having a feedback network for said audio frequency signals including first and second semiconductor diodes each having first and second electrodes and connected in series, with one electrode of said first diode coupled to said reference potential by first capacitor means and the opposite electrode of said second diode connected to said reference potential, second capacitor means coupling the common junction of said series connected diodes to said emitter electrode of said first transistor, circuit means including third capacitor means coupling the collector electrode of said second transistor to the emitter electrode of said first transistor, said second and third capacitor means providing a frequency response for said audio frequency signals that varies with the gain of said first transistor, and control circuit means providing a direct current voltage independently of said audio frequency signals, said control circuit means applying said direct current voltage to said one electrode of said first diode of each of said channels, whereby varying said direct current voltge varies the gain of said first transistor of each of said channels.

5. In an electric organ, the combination including a plurality of channels for amplifying audio frequency signals representing selected tones creating a desired musical effect, each of said channels having first and second transistors each having emitter, collector and base electrodes, circuit means supplying an operating voltage to the collector electrode of each of said transistors and a biasing voltage to the base electrode of each of said transistors, input circuit means applying selected audio frequency signals to the base electrode of said first transistor of each of said channels, with the collector electrode of said first transistor connected to apply said audio frequency signals to the base electrode of said second transistor in each of said channels, resistance means returning the emitter electrode of each said transistor to a reference potential, with said emitter return resistance means of said second transistor of each of said channels bypassed for said audio frequency signals, each said channel further having a feedback network for said audio frequency signals including first and second semiconductor diodes each having anode and cathode electrodes, with the cathode electrode of said first diode connected to the anode electrode of said second diode, circuit means including first capacitor means coupling the anode electrode of said first diode to said reference potential, second capacitor means coupling the cathode electrode of said first diode to the emitter electrode of said first transistor, circuit means including third capacitor means coupling the collector electrode of said second transistor to the emitter electrode of said first transistor, with said second and third capacitor means providing frequency compensation for the audio frequency signals coupled from the collector electrode of said second transistor to the emitter electrode of said first transistor, and control circuit means for providing a variable direct current voltage independently of said audio frequency signals and having a common piont and a variable tap point, circuit means connecting said common point to the cathode electrode of said second diode and circuit means connecting said tap point to the anode electrode of said first diode to establish a static operating point for said first and second diodes, with the dynamic resistance of said diodes and said static operating point representing a variable resistance to a feedback signal for said first transistor, whereby varying said tap point of said control voltage means changes the dynamic resistance of said diodes to control the signal translation characteristics of each of said channels.

6. In an electric organ the combination including a plurality of channels for translating audio frequency signals representing selected tones creating a desired musical effect, each of said channels having first and second transistors each having collector, emitter and base electrodes, circuit means applying an operating voltage to the collector electrode of each of said transistors and a biasing voltage to the base electrode of each of said transistors, circuit means applying selected audio frequency signals to the base electrode of said first transistor of each of said channels, with the collector electrode of said first transistor connected to the base electrode of said second transistor, resistance means returning the emitter electrode of each of said transistors to a reference potential, with said emitter return resistance means of said second transistor bypassed for said audio frequency signals, each of said channels further having a feedback network for said audio frequency signals including first and second voltage sensitive resistance means, with one side of each of said first and second voltage sensitive resistance means connected in common and the other side thereof coupled together by first capacitor means, second capacitor means coupling said common side of said resistance means to the collector electrode of said second transistor, capacitance means coupling said other side of one of said voltage sensitive resistance means to the emitter electrode of said first transistor, means for providing a control voltage independent of said audio frequency signals, and means applying said control voltage to said other side of the other one of said voltage sensitive resistance means, whereby varying said control voltage changes the signal translating characteristic of said amplifying device.

References Cited by the Examiner

UNITED STATES PATENTS

| | | | |
|---|---|---|---|
| 2,343,207 | 2/1944 | Schrader et al. ---- | 330—86 X |
| 2,732,429 | 1/1959 | Wolfe ----------- | 330—124 X |
| 2,892,042 | 6/1959 | Leypold et al. -------- | 330—86 |
| 3,030,022 | 4/1962 | Gittleman --------- | 330—24 X |
| 3,030,587 | 4/1962 | Gautherin ---------- | 330—145 |

OTHER REFERENCES

German printed application (Winiger) N11084, Sept. 20, 1956.

Hurley: "Designing Transistor Circuits—Automatic Gain Control," Electronic Equipment, June 1957, pages 22–25.

ROY LAKE, *Primary Examiner.*

NATHAN KAUFMAN, *Examiner.*